United States Patent [19]
Nozaki et al.

[11] Patent Number: 5,860,692
[45] Date of Patent: Jan. 19, 1999

[54] WEATHER STRIP FOR MOTOR VEHICLE AND METHOD FOR MANUFACTURING THE SAME

[75] Inventors: Masahiro Nozaki; Misayuki Kisanuki, both of Aichi-ken, Japan

[73] Assignee: Toyoda Gosei Co., Ltd., Aichi-ken, Japan

[21] Appl. No.: 534,970

[22] Filed: Sep. 28, 1995

[30] Foreign Application Priority Data

Sep. 28, 1994 [JP] Japan ................................... 6-258733
Nov. 11, 1994 [JP] Japan ................................... 6-303107
May 30, 1995 [JP] Japan ................................... 7-156874

[51] Int. Cl.⁶ .................................................. B60J 10/04
[52] U.S. Cl. ....................... 296/146.9; 49/498.1; 49/500.1
[58] Field of Search ............................... 296/146.9, 206; 49/492.1, 498.1, 500.1

[56] References Cited

U.S. PATENT DOCUMENTS

| 5,105,580 | 4/1992 | Akachi et al. | 49/476 |
| 5,383,701 | 1/1995 | Okada | 296/146.9 |

FOREIGN PATENT DOCUMENTS

| 3087311 | 4/1988 | Japan | 296/146.9 |
| 3-5625 | 1/1991 | Japan | |
| 3169762 | 7/1991 | Japan | 286/146.9 |
| 5024439 | 2/1993 | Japan | 296/146.9 |
| 6135237 | 5/1994 | Japan | 296/146.9 |
| 6135238 | 5/1994 | Japan | 296/146.9 |
| 6191287 | 7/1994 | Japan | 296/146.9 |
| 6191288 | 7/1994 | Japan | 296/146.9 |
| 6219162 | 8/1994 | Japan | 296/146.9 |
| 6-247224 | 9/1994 | Japan . | |

*Primary Examiner*—Dennis H. Pedder
*Attorney, Agent, or Firm*—Intellectual Property Group of Pillsbury Madison & Sutro LLP

[57] ABSTRACT

A weather strip for use with a center pillar of a motor vehicle, particularly with a center pillar having a width gradually increasing in a downward direction. The weather strip includes an extruded first tubular weather strip to be attached along a front edge of the center pillar, an extruded second tubular weather strip to be attached along a rear edge of the center pillar, and a pillar molding, interposed between these two weather strips, which has a width that gradually increases in a downward direction. A method for manufacturing the above-described weather strip includes the steps of placing first and second weather strips in a mold such that the space therebetween gradually increases downwardly and upper ends thereof face a roof side weather strip to be attached along an edge of a roof of the motor vehicle, and a rubber material is injected into the mold to join the upper ends of the first and second weather strips to the roof side weather strip. Then, by injecting a rubber material, lower ends of the first and second weather strips are joined, and by injecting a rubber material or a synthetic resin material, a pillar molding is formed that is integrally joined to the first and second weather strips.

2 Claims, 10 Drawing Sheets

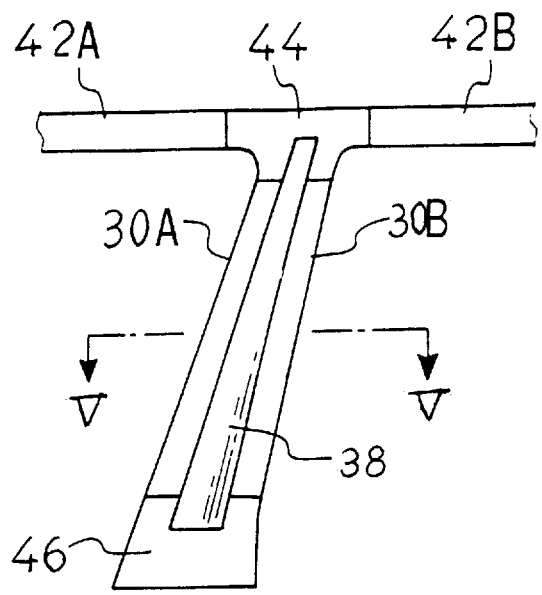
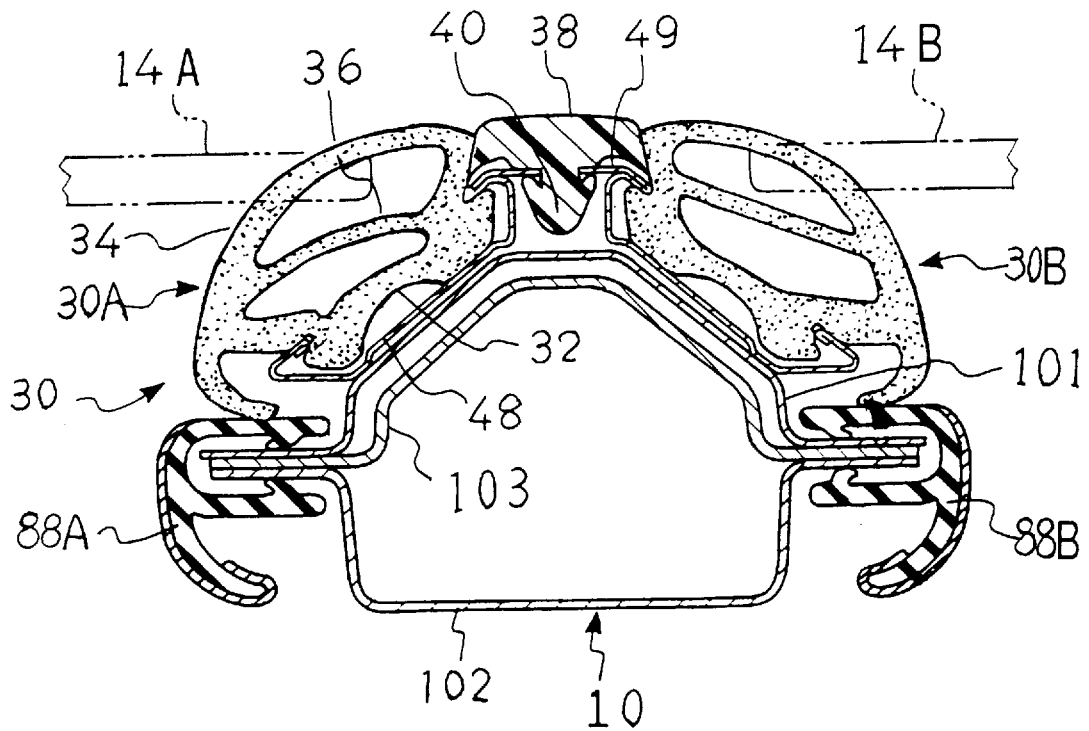

WEATHER STRIP FOR MOTOR VEHICLE AND METHOD FOR MANUFACTURING THE SAME

The following priority applications, Japanese Patent Application No. Hei 6-258733, filed in Japan on Sept. 28, 1994; Japanese Patent Application No. Hei 6-303107, filed in Japan on Nov. 11, 1994; and Japanese Patent Application No. Hei 7-156874, filed in Japan on May 30, 1995, are hereby incorporated by reference into the present specification.

BACKGROUND OF THE INVENTION

I. Field of the Invention

The present invention relates to a weather strip to be attached along a center pillar of a motor vehicle, and to a method for manufacturing the same.

II. Description of the Related Art

As shown in FIG. 1, a weather strip assembly 12 is attached along a center pillar 10 of a vehicle provided with sashless doors. As shown in FIG. 2, the weather strip assembly 12 is composed of a first weather strip 12A, adapted to seal a rear edge of a front door windows pane 14A, and a second weather strip 12B adapted to seal a front edge of a rear door window pane 14B. Upper ends of the first and second weather strips 12A and 12B are first joined to a roof side weather strip 16 (FIG. 1) that is attached along an edge of the roof of the vehicle. Then, the first and second weather strips 12A and 12B are attached along the front and rear parts of the center pillar 10, respectively. The first and second weather strips 12A and 12B are, in one example, made of sponge rubber in their entirety, and, in another example, made of sponge rubber except for their base portions, that will be attached to the center pillar 10, which are made of solid rubber.

Weather strip assemblies 12, composed of first and second weather strips 12A and 12B between which a pillar molding, have been frequently used.

Furthermore, in order to conform the configuration of the center pillar to that of a door opening of a side body of the vehicle, the width of the center pillar gradually increases downwardly. However, where the first and second weather strips 12A and 12B are formed integrally by extrusion, the cross-section of the extruded weather strip is uniform so that the extruded weather strip cannot be conformed to the center pillar of which the width gradually increases downwardly.

The weather strip for a center pillar can be manufactured by forming the first weather strip 12A, the second weather strip 12B and the pillar molding 18 integrally by molding, as set forth in Japanese Utility Model application laid-open No. Hei 3-5625, for example. With this method, the molded weather strip can be conformed to a center pillar whose width gradually changes downwardly. However, cores for forming tubular portions of the weather strip must be removed after molding thus lowering work efficiency.

As shown in FIG. 2, in order to improve shape-retention, the weather strips 12A and 12B are generally provided with internal bridges 20 which respectively extend across the tubular portions thereof. These bridges 20, however, are very difficult to form during molding. Therefore, bridges 20 have been formed, as shown in FIG. 3, by inserting fillers 26 serving as bridges into the tubular portions of the weather strips 12A and 12B through slit 24 adapted to remove the cores after molding. This insertion is also difficult, inefficient and costly.

SUMMARY OF THE INVENTION

Accordingly, it is an object of the present invention to provide a weather strip for use with a center pillar composed of a first weather strip for contacting a rear edge of a front door window pane, a second weather strip to contact a front edge of a rear door windows pane, and a pillar molding interposed between the first and second weather strips. The pillar molding should have a width which gradually increases downwardly in conformity with the configuration of the center pillar.

Another object of the present invention is to provide a weather strip for a center pillar, of which the pillar molding closely contacts the first and second weather strips without the intrusion of water therebetween.

A further object of the present invention is to provide an efficient method for manufacturing the above-described weather strip for use with a center pillar.

The weather strip of the present invention is composed of first and second extruded weather strips each having a tubular configuration and attached along a front part and a rear part of the center pillar, respectively. The present invention also includes a pillar molding interposed between the first and second weather strips which join them together. The space between the first weather strip and the second weather strip gradually increases downwardly, and accordingly the width of the pillar molding gradually increases downwardly. As the pillar molding, a molding body can be used.

The weather strip of the present invention is manufactured by arranging the first and second weather strips such that the space therebetween gradually increases downwardly. The upper ends of the first and second weather strips face a longitudinally central part of a roof side weather strip attached along an edge of a roof of a vehicle in generally perpendicular relation therewith. By placing the thus arranged upper ends of the first and second weather strips, the central part of the roof side weather strip and the lower ends of the first and second weather strips in a mold, and thereafter injecting a rubber material into such a closed mold, the roof side weather strip becomes joined to the upper ends of the first and second weather strips, and the lower ends of the first and second weather strips are joined to each other. Then by placing the resulting molded structure in another mold, the injecting of a rubber material or synthetic resin material into the space between the first and the second weather strips will mold a pillar which is integrally joined to the first and second weather strips.

Another weather strip in accordance with the present invention is composed of first and second weather strips and a pillar molding. The pillar molding is composed of an inner molding and an outer molding. The inner molding is interposed between the first weather strip and the second weather strip and attached to a center pillar, and the outer molding has a configuration substantially identical to that of the inner molding and is arranged so as to cover the inner molding and is attached to the inner molding. Upon attachment of the outer molding to the inner molding, a projection formed along a rear edge of the first weather strip is pressed between front edges of the inner molding and the outer molding while a projection formed along a front edge of the second weather strip is pressed between rear edges of the inner molding and the outer molding, whereby the first and second weather strips are connected to the pillar molding composed of the inner molding and the outer molding.

A further weather strip of the present invention is composed of first and second tubular weather strips and a pillar molding, which are formed integrally by extrusion, such that the width of the pillar molding gradually increases in a downward direction.

The pillar molding has a longitudinally extending thin-walled part. This pillar molding is extruded such that the width of the thin-walled part gradually increases in a downwardly direction.

Other objects, features, and characteristics of the present invention will become apparent upon consideration of the following description and the appended claims with reference to the accompanying drawings, all of which form a part of this specification.

BRIEF DESCRIPTION OF THE DRAWINGS

FIG. 4 is a front view of a first embodiment of a weather strip in accordance with the present invention;

FIG. 5 is a cross-sectional view showing the attaching state of the weather strip, taken along the line V—V of;

DETAILED DESCRIPTION OF THE PRESENTLY PREFERRED EXEMPLARY EMBODIMENTS

Figure 1:
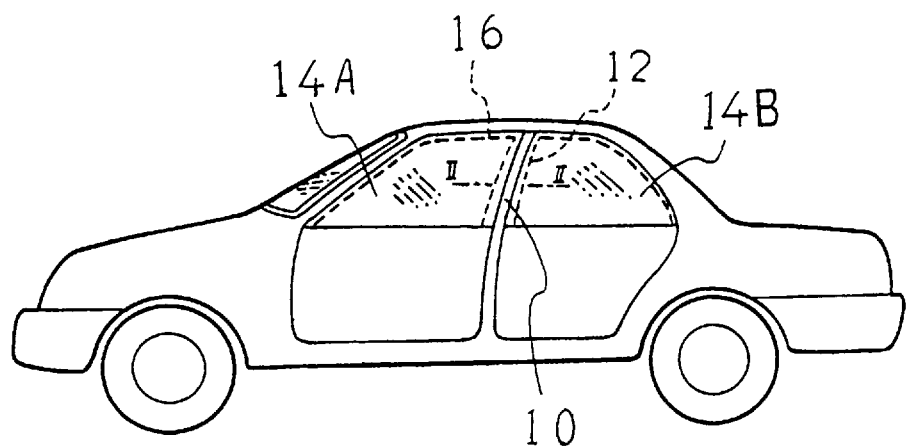
FIG. 1 is a side elevation view of a motor vehicle to which the present invention is applied.
Figure 2:
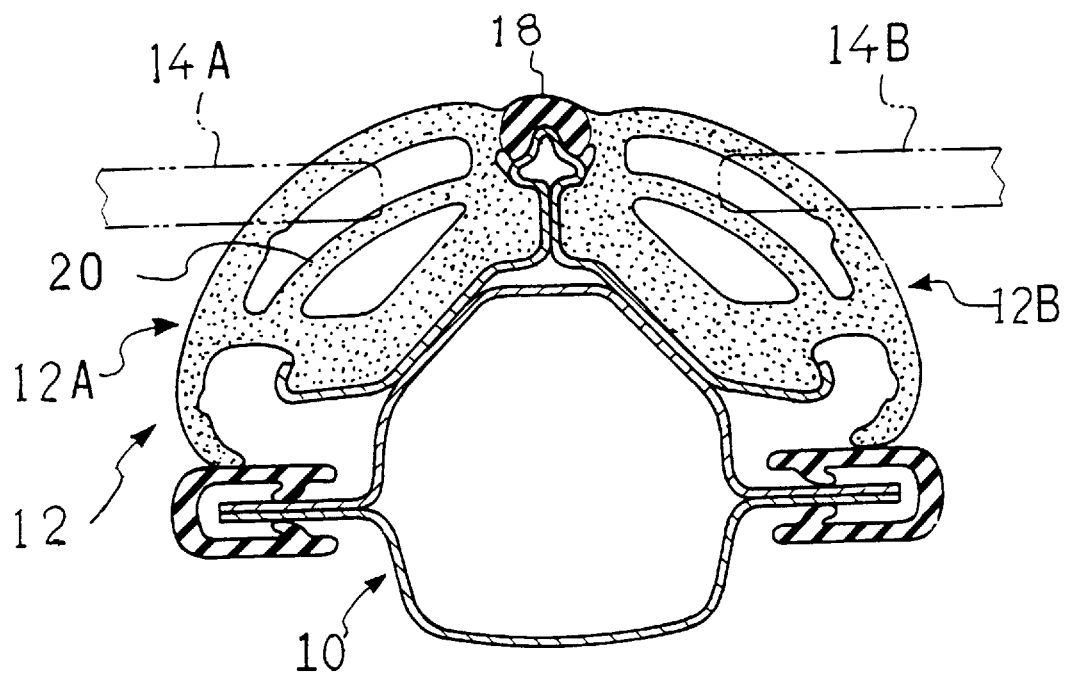
FIG. 2 is a cross-sectional view showing the attaching state of a conventional weather strip, taken along the line II—II of FIG. 1.
Figure 3:
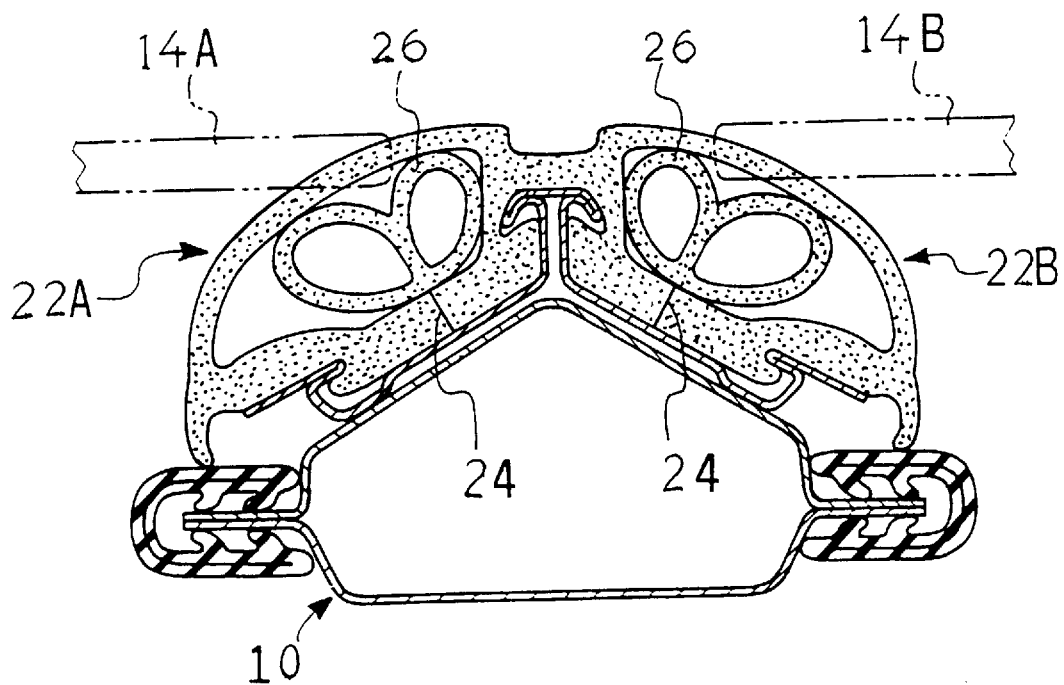
FIG. 3 is a cross-sectional view showing the attaching state of another conventional weather strip.

FIGS. 4 and 5 illustrate a first embodiment of a weather strip in accordance with the present invention.

As shown, an upper end of a weather strip 30 to be attached to a center pillar 10 of a motor vehicle is joined to facing ends of a roof side weather strips 42A and 42B.

A first weather strip 30A on the front side and a second weather strip 30B on the rear side are both extruded tubular bodies of sponge rubber, which have substantially identical constructions. Each weather strip has a base portion 32, a sealing portion 34 adapted to seal a vertical edge of a front door window pane 14A or a rear door window pane 14B, and a bridge 36 which divides the tubular portion defined by the base portion 32 and the sealing portion 34. The weather strips 30A and 30B are joined integrally via a molded pillar molding or joint 38 which serves as a pillar molding.

The molded pillar molding 38 is composed of solid rubber or thermoplastic synthetic resin, and has a width which gradually increases in a downward direction. Accordingly, the weather strip 30 also has a width which gradually increases downwardly.

The pillar molding 38 has clips 40 which project from a rear face thereof at predetermined intervals in the longitudinal direction thereof. These clips 40 are formed during the molding of the pillar molding 38. An upper end and a lower end of the pillar molding 38 protrude from an upper end and a lower end of each of the weather strips 30A and 30B, respectively.

The upper ends of the weather strips 30A and 30B, from which the pillar molding 38 protrudes, are joined integrally to facing ends of the extruded roof side weather strips 42A and 42B via a molded joint 44 having a letter T-like configuration. The lower ends of the weather strips 30A and 30B, from which the pillar molding 38 protrudes, are joined to each other by a molded end part 46.

As shown in FIG. 5, the center pillar 10 is composed of an outer panel 101, an inner panel 102 and a reinforcement 103 which are secured together in front and rear flanges thereof. The width of the center pillar 10 gradually increases downwardly. The outer panel 101 has a mountain-like cross-section. A retainer 48 is attached to the outer panel 101 by screws (not shown).

The widthwise central part of the retainer 48 protrudes outwardly and serves as a pillar molding receiving part 49. The pillar molding receiving part 49 has clip holes at predetermined intervals in the longitudinal direction thereof in which clips 40 are retained.

The weather strip 30 is attached to the center pillar 10 by pressing the clips 40 of the pillar molding 38 into the clip holes of the receiving part 49 to position the pillar molding 38 on the retainer 48, and then, fitting the first and second weather strips 30A and 30B in a front part and a rear part of the retainer 48, respectively.

Figure 6:
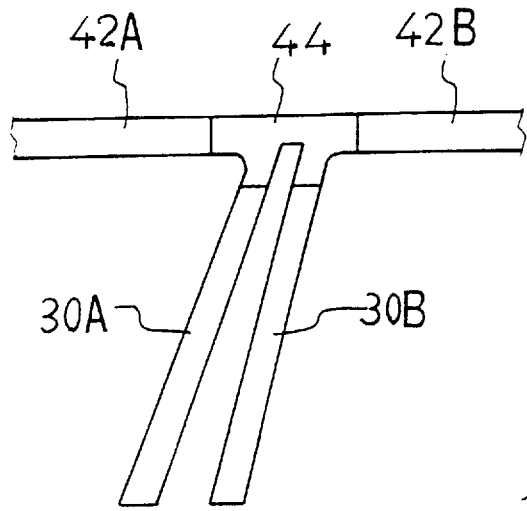
FIG. 6 is a view showing the manufacturing process of the first embodiment of the weather strip.
Figure 6:
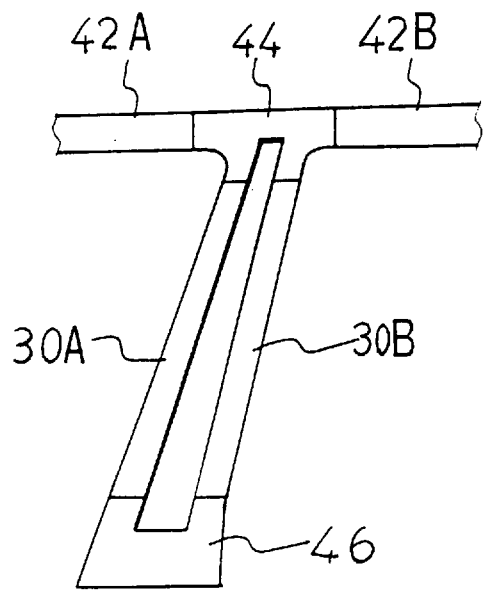
Figure 6:
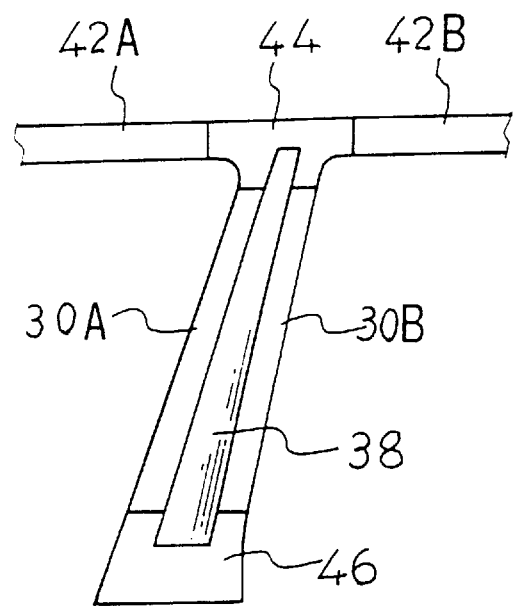

FIGS. 6(A), 6(B) and 6(C) illustrate the manufacturing process of the weather strip 30.

First, the first weather strip 30A and the second weather strip 30B, each having a bridge 36 and being a tubular body of sponge rubber, are respectively prepared by extrusion. These weather strips 30A and 30B are cut to predetermined lengths, respectively, and are arranged side by side, as shown in FIG. 6(A), such that the space therebetween gradually increases downwardly. Then, previously prepared extruded roof side weather strips 42A and 42B are arranged in a straight line such that ends thereof face each other, and upper ends of the weather strips 30A and 30B face ends of the roof side weather strips 42A and 42B in approximately perpendicular relation therewith. Next, these ends of the weather strips 30A, 30B, 42A and 42B are placed in a letter T-shaped cavity of a mold (not shown) and a sponge rubber material is injected into the cavity, whereby the weather strips 30A, 30B, 42A and 42B are joined via a molded joint 44.

Then, the lower ends of the fist and second weather strips 30A and 30B are placed in a letter U-shaped cavity of another mold (not shown), and sponge rubber material is injected into the cavity to mold an end part 46, as shown in FIG. 6(B).

Next, the first and second weather strips 30A and 30B, joined via the molded joint 44 and the molded end part 46, can then be placed in yet another mold, and a solid rubber material or thermoplastic resin material is injected into the space between the facing side edges of the weather strips 30A and 30B. As shown in FIG. 6(C), this produces a pillar molding 38 having a width that gradually increases in a downward direction and formed integrally between the weather strips 30A and 30B. During the molding of the pillar molding 38, the clips 40 are formed integrally with the pillar molding 38, as shown in FIG. 5.

It should be understood that the molded joint 44 and the molded end part 36 may be formed simultaneously by placing both the upper and lower ends of the first and second weather strips 30A and 30B in a single mold.

Alternatively, after the end part 46 is molded, the weather strips 30A and 30B may be joined to the roof side weather strips 42A and 42B.

With the present embodiment, since the pillar molding 38 is joined integrally to the first and second weather strips 30A and 30B, the weather strip 30 is free from water leakage which has been encountered with conventional weather stripping.

Furthermore, with the present embodiment, the upper joint 44, the lower end part 46 and the pillar molding 38 can be formed successively by molding. This enables the improvement of the work efficiency.

Figure 7:
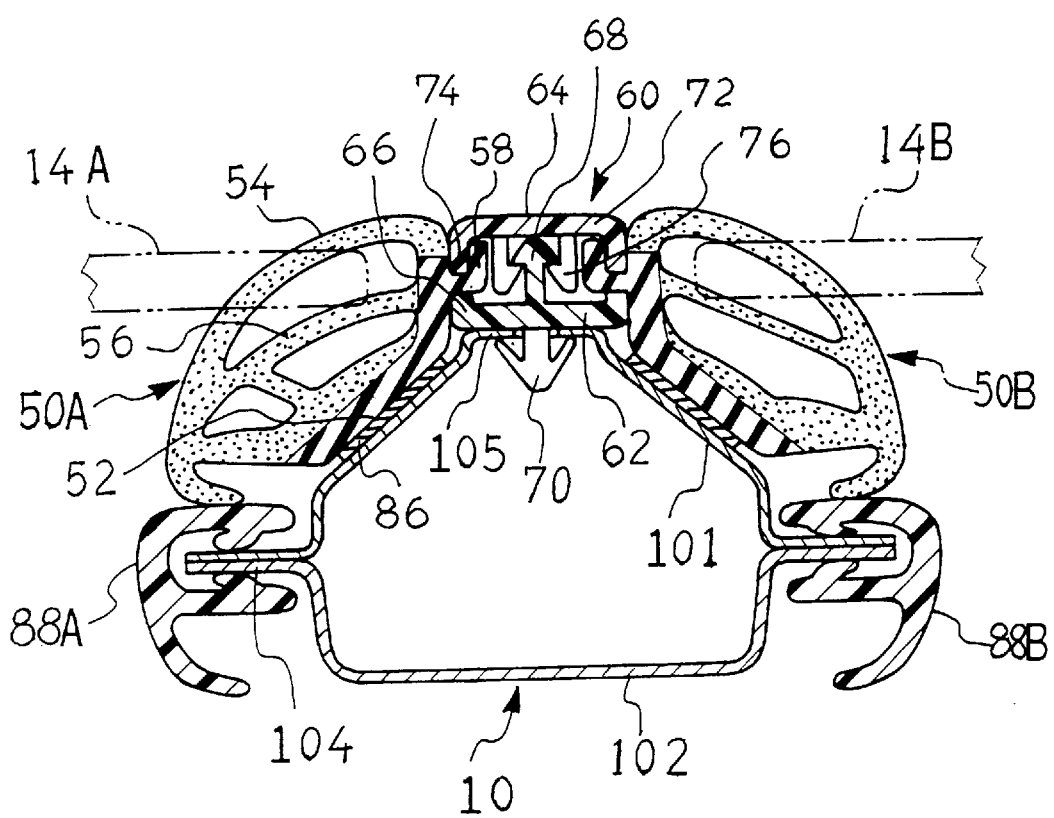
FIG. 7 is a cross-sectional view showing the attaching state of a second embodiment of a weather strip in accordance with the present invention, taken along the same line as that of FIG. 2.

FIGS. 7, 8, 9 and 10 illustrate a second embodiment of the present invention. As shown in FIG. 7, the center pillar 10 is composed of an outer panel 101 and an inner panel 102. These panels 101 and 102 are secured in front and rear flanges 104 to define a closed cross-section. The outer panel 101 has sloping sides and a central flattened portion configuration.

A first weather strip 50A adapted to seal a rear edge of a front door window panel 14A and a second weather strip 50B adapted to seal a front edge of a rear door window pane 14B are both extruded tubular bodies having substantially identical constructions.

Each of the weather strips 50A and 50B has a base portion 52, a sealing portion 54 and a bridge 56 which divides the tubular portion defined by the base portion 52 and the sealing portion 54. The base portion 52 is made of solid rubber while the remaining portion is made of sponge rubber. Opposed side faces of the weather strips 50A and 50B have letter L-shaped projections 58, each projecting from the base portion 52 to define a longitudinally extending groove with the opposed side face of the weather strip 50A or 50B.

As shown in FIGS. 7 through 10, a pillar molding 60 is composed of an inner molding 62 and an outer molding 64, which are respectively molded from synthetic resin.

Figure 8:
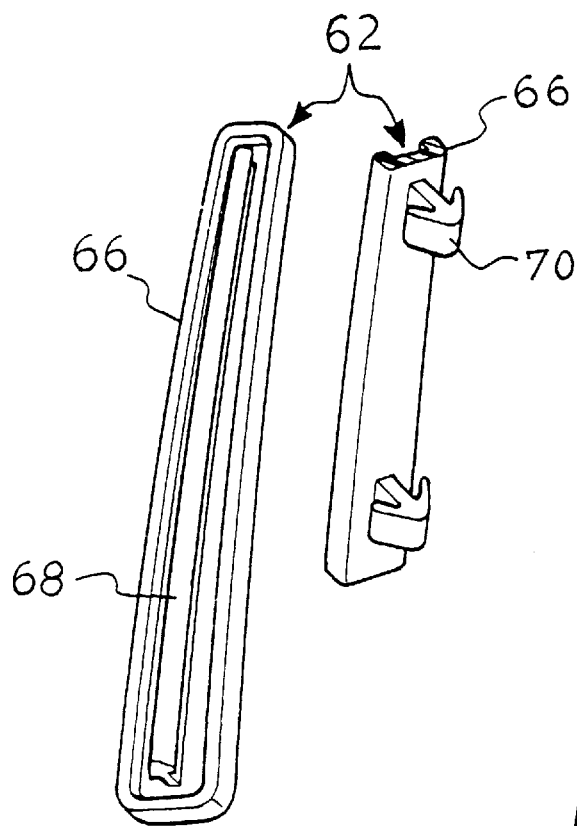
FIG. 8 is a perspective view of an inner molding used in the second embodiment, seen from outer and rear sides thereof.

As shown in FIGS. 7 and 8, the peripheral edge 66 of the inner molding 62 protrudes outwardly to define a flange. A longitudinally extending engaging projection 68, having a tip end of a triangular cross-section, is formed at a widthwise center of an outside face of the inner molding 62. Clips 70, each having claws at the tip end, are formed on an inside face of the inner molding 62 at predetermined intervals in the longitudinal direction thereof.

Figure 9:
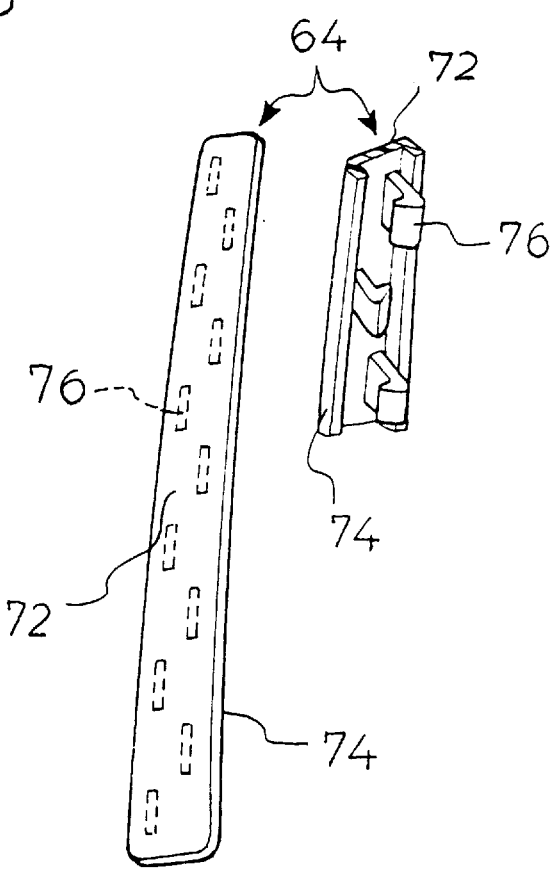
FIG. 9 is a perspective view of an outer molding used in the second embodiment, seen from outer and rear sides thereof.
Figure 10:
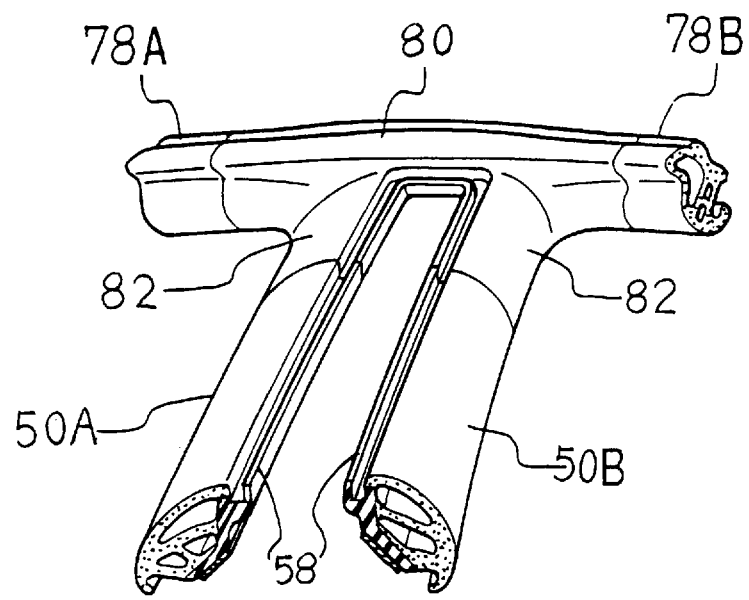
FIGS. 10(A) and 10(B) are perspective views of main parts of the second embodiment of the weather strip.
Figure 10:
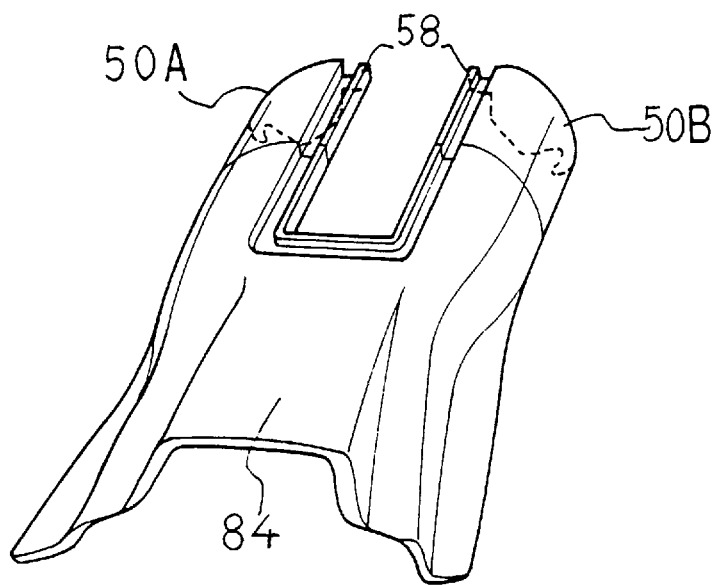

As shown in FIGS. 7 and 9, the peripheral edge 74 of the outer molding 64 protrudes inwardly to define a flange. Engaging parts 76, each having a claw-shaped tip end, are formed in a zigzag pattern on an inside face of head portion 72 of the outer molding 64 at predetermined intervals in the longitudinal direction thereof.

The upper ends of the first and second weather strips 50A and 50B are joined to a roof side weather strip to be attached to an edge of the roof of a motor vehicle. As shown in FIG. 10(A), a roof side weather strip is separated into weather strips 78A and 78B. The weather strips 78A, 78B, 50A and 50B are joined via a molded joint 80. An L-shaped projection is formed along an inner periphery of leg portions 82 of the molded joint 80. This L-shaped projection is continuous with the L-shaped projections 58 of the weather strips 50A and 50B. As shown in FIG. 10(B) a molded end part 84 is formed when joining the lower ends of the weather strips 50A and 50B to each other. An L-shaped projection is also formed in an inner periphery of the molded end part 84 so as to be continuous with the L-shaped projections 58 of the weather strips 50A and 50B.

The first and second weather strips 50A and 50B and the pillar molding 60 are assembled to the center pillar 10. The clips 70 of the inner molding 52 are press-fitted into engaging holes formed in a top face 105 of the outer panel 101 of the center pillar 10 to attach the inner molding 62 to the outer panel 101.

Then, the first and second weather strips 50A and 50B are placed along the front part and rear part of the outer panel 101, respectively, and the L-shaped projections 58 formed in the weather strips 50A and 50B, molded joint 80 and molded end part 84 are superimposed on the flange-like edge 66 of the inner molding 62. And the outer molding 64 is attached. The outer molding 64 has a configuration and a size conforming to the space defined by the weather strips 50A, 50B, molded joint 80 and molded end part 84. The flange-like edge 74 is fitted onto the L-shaped projection 58, and the engaging parts 76 are engaged with the engaging projection 68 of the inner molding 62, whereby the inner molding 62 and the outer molding 64 are integrally connected, and the L-shaped projections 58 of weather strips 50A and 50B are pressed between the inner molding 62 and the outer molding 64.

The thus positioned weather strips 50A, 50B are then pressed on the outer panel 101 from the outside thereof, whereby the weather strips 50A and 50B are bonded to the front and rear parts of the outer panel 101 with double-sided adhesive tapes 86, each tape having been previously bonded to a respective base portion 52.

Reference numerals 88A and 88B respectively denote trim strips attached to the flanges 104 of the center pillar 10.

As described above, with the present embodiment, by attaching the outer molding 64 to the inner molding 62, seals between the pillar molding 60 and the first and second weather strips 50A and 50B are also established. The L-shaped projections 58 of the weather strips 50A and 50B are pressed between the peripheral edges of the inner molding 62 and the outer molding 64, thereby preventing the generation of gaps therebetween, and accordingly exhibiting improved sealing properties.

When the weather strips are bonded to the center pillar with the double-sided adhesive tapes, the weather strips are likely to be attached to the positions offset from the predetermined positions. With the present embodiment, by attaching the outer molding 64 to the inner molding 62 with the projections 58 of the weather strips 50A and 50B pressed therebetween, the weather strips 50A and 50B can be positioned on the center pillar 10. Subsequently, they can be bonded with the double-sided adhesive tapes to the predetermined positions without offsetting therefrom.

The present embodiment can be also applied to a center pillar having a width that gradually increases in a downward direction by forming both the inner molding 62 and the outer molding 64 so as to have a width which also gradually increases in a downward direction.

The projections 58 of the weather strips 50A and 50B may be formed into a plane flange-like configuration. But, the L-shaped projection 58, as shown in the present embodiment, is preferable, because the flange-like edges of the outer molding are firmly fitted onto the projections 58 to create a more stable sealing construction.

The weather strips 50A and 50B may be fitted in retainers provided in the center pillar 10.

Figure 11:
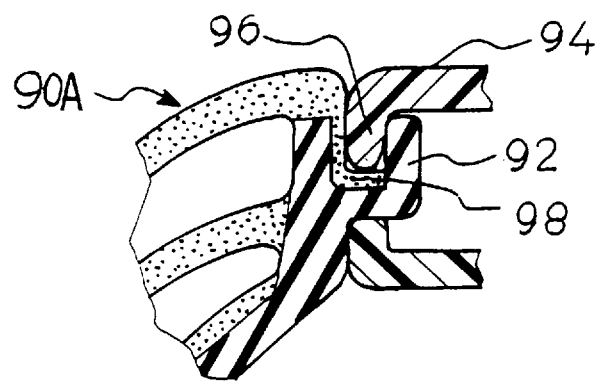
FIG. 11 is a cross-sectional view of a main part of another example of a connecting portion of the weather strip and the pillar molding.
Figure 12:
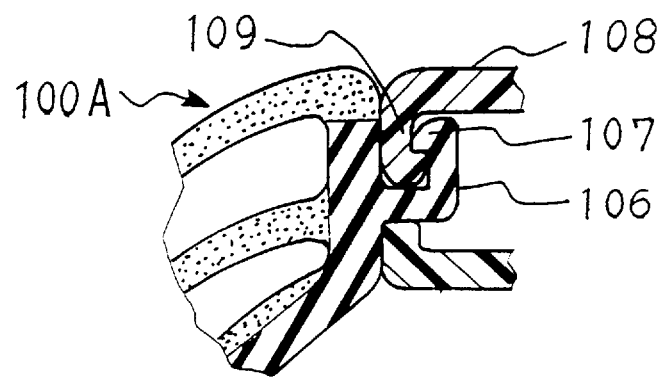
FIG. 12 is a cross-sectional view of a main part of a further example of a connecting portion of the weather strip and the pillar molding.
Figure 13:
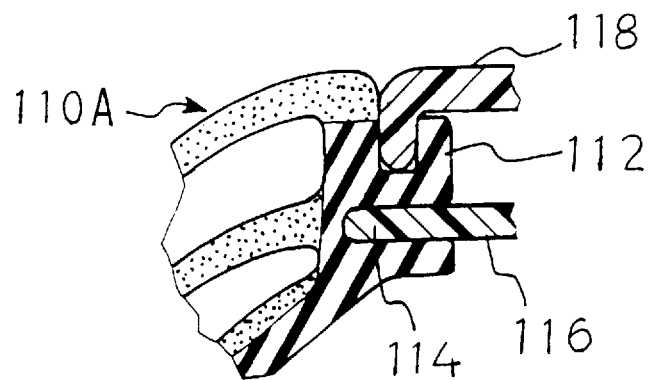
FIG. 13 is a cross-sectional view of a main part of a still further example of a connecting portion of the weather strip and the pillar molding.

FIGS. 11, 12, and 13 illustrate other examples of the connecting construction of the weather strip and the pillar molding (in the drawings, the second weather strips are omitted).

In the example of FIG. 11, a sponge layer 98 is formed on an inside surface of an L-shaped projection 92 of a first weather strip 90A. A flange-like peripheral edge 96 of an outer molding 94 is pressed on the sponge layer 98 to improve the sealing properties between the outer molding 94 and the first weather strip 90A.

In the example of FIG. 12, a claw 107 is formed at a tip end of an L-shaped projection 106 of a first weather strip 100A, and a tip end of a flange-like peripheral edge 109 of an outer molding 108 is formed into an L-shaped cross-section. This arrangement strengthens the engaging force of the projection 106 and the outer molding 108.

In the example of FIG. 13, a slot 114 is formed in the side face of a first weather strip 110A beneath an L-shaped projection 112. A flat peripheral edge of an inner molding 116 is press-fitted to the slot 114. This arrangement improves the sealing properties between the first weather strip 110A and the inner molding 116.

With the present embodiment, by attaching the inner molding and the outer molding to the center pillar, an improved seal between the inner and outer moldings and the front and rear weather strips can be also realized. In addition, ends of the front and rear weather strips can be positioned on the center pillar so that they can be secured to the center pillar precisely with double-sided adhesive tapes.

FIGS. 14 through 17 illustrate a third embodiment of the present invention.

Figure 14:
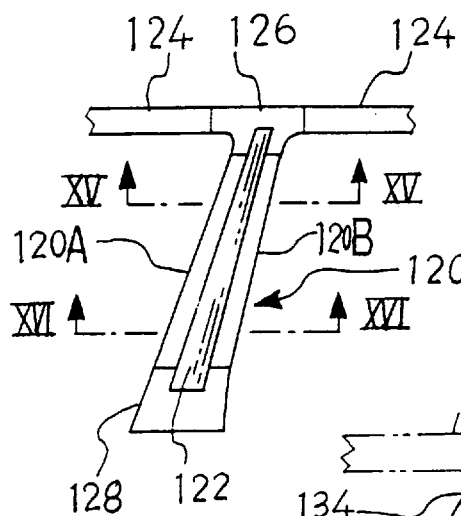
FIG. 14 is a front view of a third embodiment of a weather strip in accordance with the present invention.
Figure 15:
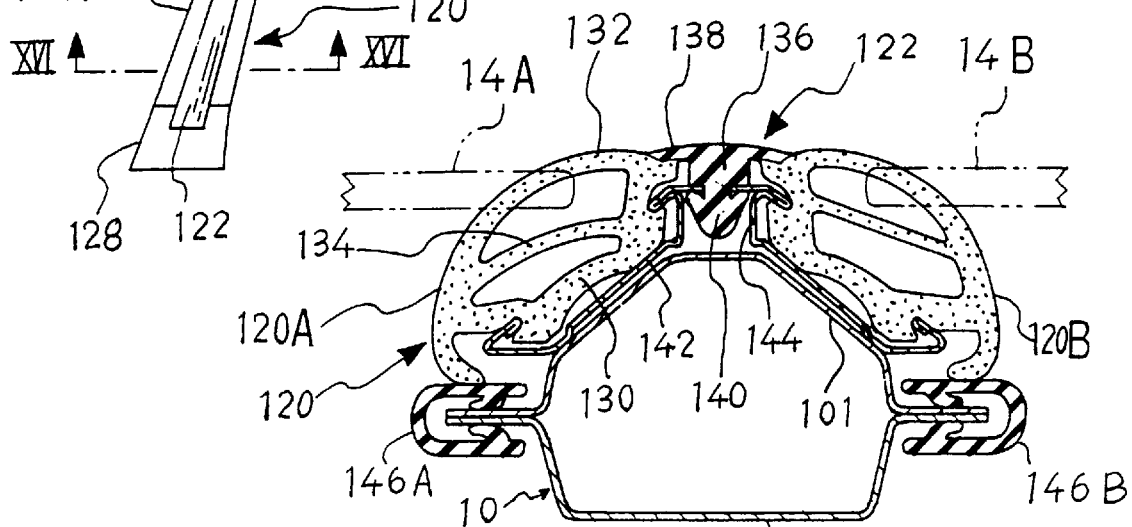
FIG. 15 is a cross-sectional view showing the attaching state of the third embodiment of the weather strip, taken along the line XV—XV of FIG. 14.
Figure 16:
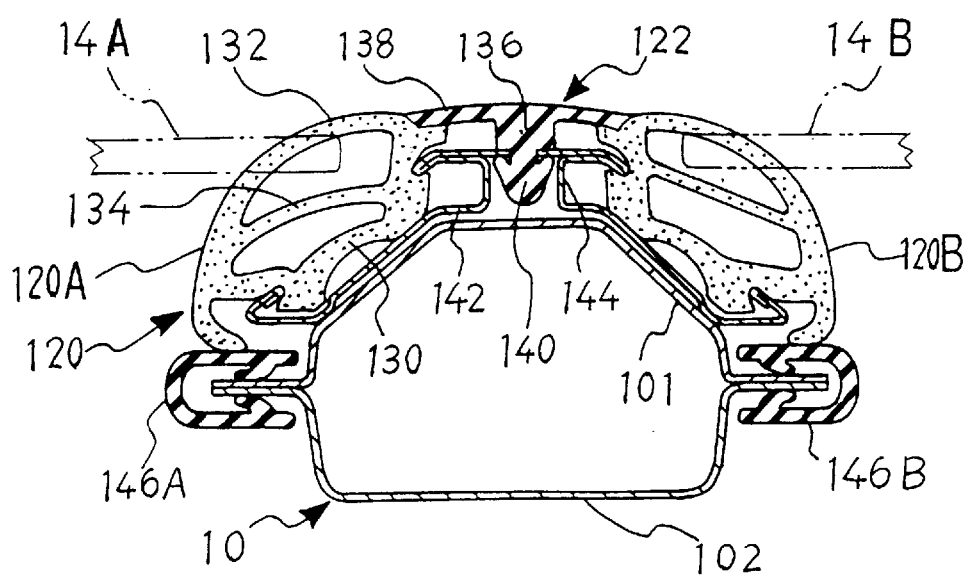
FIG. 16 is a cross-sectional view showing the attaching state of the third embodiment of the weather strip, taken along the line XVI—XVI of FIG. 14.

As shown in FIG. 14, a weather strip 120 is an extruded integrally body composed of a first weather strip 120A, a second weather strip 120B and a pillar molding 122 which joins the weather strips 120A and 120B. Upper ends of the first and second weather strips 120A and 120B are joined to separated roof side weather strips 124 via a molded joint 126 while lower ends thereof are joined to each other by a molded end part 128. The detailed construction of the weather strip 120 will be explained with reference to FIGS. 15 and 16.

The first weather strip 120A and the second weather strip 120B are, respectively, tubular bodies made of sponge rubber, which have substantially identical configurations. Each of the weather strips 120A and 120B is composed of a base portion 130, a sealing portion 132 and a bridge 134. Opposed side edges of these weather strips 120A and 120B are joined via the pillar molding 122.

The pillar molding 122 is made of solid rubber or synthetic resin, and is composed of a thick-walled central part 136 and thin-walled side parts 138 on each side of central part 136 adapted to be joined to the first and second weather strips 120A and 120B. An interior portion of the thick-walled central part 136 defines a clip 140.

The width of each of the thin-walled side parts 138 gradually increase from its upper end (FIG. 15) to its lower end (FIG. 16), thereby increasing the width of the pillar molding 122 gradually from its upper end to its lower end, as shown in FIG. 14. This results in the width of the weather strip 120, including the first and second weather strips 120A and 120B, gradually increasing from its upper end to its lower end.

A retainer 142 is attached to an outer panel 101 of a center pillar 10, which also has sloping sides in cross-section. The retainer 142 has a protruding part 144 in a top face thereof. The protruding part 144 has a longitudinally extending opening. By pressing the clip 140 of the pillar molding 122 into the opening of the protruding part 144, the pillar molding 122 is secured to the center pillar 10. The base portions 130 of the weather strips 120A and 120B are fitted to the front and rear parts of the retainer 142, whereby the weather strip 120 is secured to the center pillar 10.

The outer panel 101 and the inner panel 102 of the center pillar 10 are welded in front and rear flanges thereof. Trim strips 146A and 146B are hereagain attached to the welded front and rear flanges.

Figure 17:
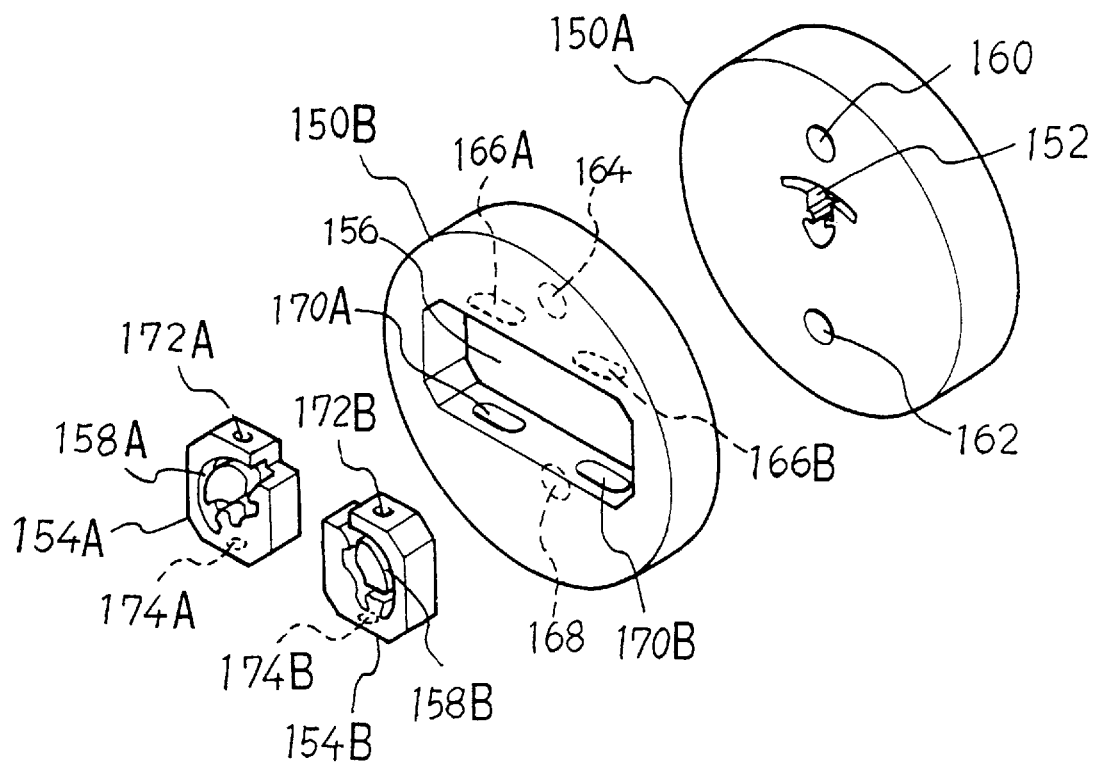
FIG. 17 is an exploded view of a main part of an extruder for extruding the third embodiment of the weather strip.
Figure 18:
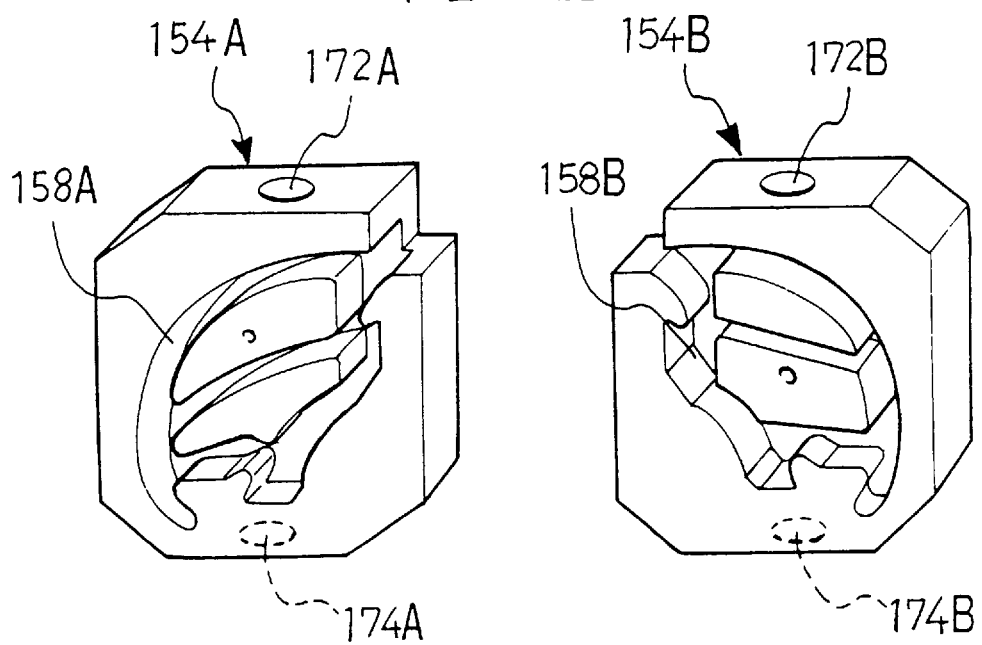
FIG. 18 is a partially enlarged view of the extruder of FIG. 17.

The weather strip 120 can be formed integrally by extrusion. FIGS. 17 and 18 illustrate main parts of an extruder for extruding the weather strip 120. A main die plate 150A adapted to extrude the pillar molding 122 is mounted on a front end of an extrusion head (not shown) and a fixed die plate 150B is mounted on a front face of the main die plate 150A. The main die plate 150A has at its center an extrusion opening 152, and the fixed die plate 150B has at its center an opening 156 adapted to pass the extruded pillar molding 122 and accommodate the movable die plates 154A and 154B. The movable die plates 154A and 154B, respectively, have grooves 158A and 158B in their front faces. The grooves 158A and 158B, respectively, have cross-sections identical to those of the first and second weather strips 120A and 120B (FIG. 14). The main die plate 150A has openings 160 and 162, the fixed die plate 150B has openings 164, 166A, 166B, 168, 170A and 170B. The movable die plate 150A has openings 172A and 174A, and the movable die plate 154B has openings 172B and 174B. The opening 164 of the fixed die plate 150B is interconnected with the openings 166A and 166B, and the opening 168 is interconnected with the openings 170A and 170B.

The movable die plates 154A and 154B are movable rightward and leftward within the opening 156 of the fixed die plate 150B.

When the movable plates 154A and 154B are located at right and left ends of the opening 156, the upper ends of the grooves 158A and 158B substantially align with right and left ends of the extrusion opening 152 of the main die plate 150B.

The pillar molding 122 (FIG. 14) made of solid rubber, which is extruded out of the extrusion opening 152 of the main die plate 150A, is led out from a center of the opening 156 of the fixed die plate 150B. The sponge rubber adapted to form the first and second weather strips 120A and 120B is supplied from the opening 160 of the main die plate 150A to the opening 164 of the fixed die plate 150B. Then, the sponge rubber diverges toward the openings 166A and 166B, and is supplied to the grooves 158A and 158B of the movable die plates 154A and 154B via the openings 172A and 172B. The sponge rubber is also supplied from the opening 162 of the main die plate 150A to the opening 168 of the fixed die plate 150B and diverges towards the openings 170A and 170B. Then, the sponge rubber is supplied to the grooves 158A and 158B of the movable die plates 154A and 154B via the openings 174A and 174B. This results in upper ends of the first and second weather strips 120A and 120B (FIG. 14) which have been extruded from the grooves 158A and 158B being joined integrally to right and left ends of the pillar molding 172 (FIG. 14) which has been extruded out of the extrusion opening 152 of the main die plate 150A.

By moving the movable die plates 154A and 154B in the directions away from or close to each other, the width of the thin-walled part 138 (FIG. 15 and 16) of the pillar molding 122, and accordingly the overall width of the pillar molding 122, can be gradually changed. The amount of solid rubber is controlled by means of a well known controller in accordance with the movement of the movable die plates 154A and 154B and the change of the width of the thin-walled part 138 of the pillar molding 122.

Thus, by changing the width of the thin-walled part 138 of the pillar molding 122 gradually, the overall width of the extruded weather strip 120 can be changed gradually.

Conventionally, the pillar molding has been formed thick in its entirety. Where a thick pillar molding is extruded so that the width gradually changes is extruded, the sectional area thereof greatly changes during extruding so that the supply amount and supply timing of material must be carefully controlled. In contrast, with the present embodiment, the opening area of the extrusion opening changes only in the part adapted to form the thin-walled part 138 so that the rate of change of the amount of solid rubber is extremely small relative to the rate of change of the width of the extruded pillar molding. Accordingly, if the rate of change of amount of solid rubber varies slightly from the predetermined value, this will not cause the production of inferior weather strips.

As described above, with the present embodiment, weather strips for center pillar, each being composed of two weather strips joined via the central pillar molding, the pillar molding having a width which gradually changes from its one longitudinal end toward its other end, and good surface quality, can be formed integrally by extrusion.

While the invention has been described in connection with what are considered presently to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. A weather strip for the center pillar of a motor vehicle, the width of which gradually increases in a downward direction, comprising:

a first weather strip composed of an extruded tubular body for sealing along a front edge of the center pillar, a second weather strip composed of an extruded tubular body for sealing along a rear edge of the center pillar, said second weather strip facing said first weather strip with a space therebetween which gradually increases in a downward direction; and a pillar molding interposed and sealing connected between said first weather strip and said second weather strip to join said first weather strip and said second weather strip and said pillar molding into an integral unit, said pillar molding having a width which gradually increases in a downward direction.

2. The weather strip as in claim 1, wherein said pillar molding is formed by injection molding.

* * * * *